United States Patent
LeMay et al.

(10) Patent No.: US 9,703,703 B2
(45) Date of Patent: Jul. 11, 2017

(54) CONTROL OF ENTRY INTO PROTECTED MEMORY VIEWS

(71) Applicant: INTEL CORPORATION, Santa Clara, CA (US)

(72) Inventors: Michael LeMay, Hillsboro, OR (US); Ravi L. Sahita, Beaverton, OR (US); Barry E. Huntley, Hillsboro, OR (US); David M. Durham, Beaverton, OR (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 46 days.

(21) Appl. No.: 14/581,730

(22) Filed: Dec. 23, 2014

(65) Prior Publication Data

US 2016/0179665 A1   Jun. 23, 2016

(51) Int. Cl.
  *G06F 12/00* (2006.01)
  *G06F 13/00* (2006.01)
  *G06F 12/08* (2016.01)
  *G06F 9/455* (2006.01)

(52) U.S. Cl.
  CPC .......... *G06F 12/08* (2013.01); *G06F 9/45558* (2013.01); *G06F 2009/45583* (2013.01); *G06F 2009/45591* (2013.01); *G06F 2212/657* (2013.01)

(58) Field of Classification Search
  CPC ...... G06F 9/526; G06F 9/544; G06F 13/1663; G06F 15/167; G06F 9/45558; G06F 2009/45583
  See application file for complete search history.

(56) References Cited

U.S. PATENT DOCUMENTS

| | | | |
|---|---|---|---|
| 7,117,481 B1 * | 10/2006 | Agesen | G06F 9/526 717/120 |
| 8,533,428 B2 * | 9/2013 | Bennett | G06F 9/45533 711/2 |
| 2005/0081199 A1 * | 4/2005 | Traut | G06F 9/45558 718/1 |

(Continued)

OTHER PUBLICATIONS

Intel 64® and IA-32 Architectures Software Developer's Manual, Sep. 2014, Chapters 7, 25 and 28, vol. 3 (3A, 3B & 3C): System Programming Guide.

(Continued)

*Primary Examiner* — Sean D Rossiter
(74) *Attorney, Agent, or Firm* — Grossman, Tucker, Perreault & Pfleger, PLLC

(57) ABSTRACT

Generally, this disclosure provides systems, devices, methods and computer readable media for controlled memory view switching. The system may include a memory module comprising a shared address space between a first memory view and a second memory view. The system may also include a virtual machine monitor (VMM) to maintain a list of Controlled View Switch (CVS) descriptors. The system may further include a processor to receive a memory view switch request and to execute an instruction to save processor state information and switch from the first memory view to the second memory view, wherein the second memory view is specified by an extended page table pointer (EPTP) provided by one of the CVS descriptors.

25 Claims, 9 Drawing Sheets

(56) References Cited

U.S. PATENT DOCUMENTS

| | | | |
|---|---|---|---|
| 2013/0086236 A1* | 4/2013 | Baucke | H04L 45/50 709/223 |
| 2013/0117743 A1 | 5/2013 | Neiger et al. | |
| 2013/0174147 A1 | 7/2013 | Sahita et al. | |
| 2014/0173600 A1* | 6/2014 | Ramakrishnan Nair | G06F 9/461 718/1 |
| 2014/0380009 A1* | 12/2014 | Lemay | G06F 12/145 711/163 |
| 2015/0178497 A1* | 6/2015 | Lukacs | G06F 9/461 726/23 |
| 2015/0370628 A1* | 12/2015 | Zmudzinski | G06F 11/1016 711/133 |
| 2015/0378633 A1* | 12/2015 | Sahita | G06F 3/0622 711/163 |
| 2016/0048458 A1* | 2/2016 | Lutas | G06F 9/45558 711/163 |
| 2016/0188354 A1* | 6/2016 | Goldsmith | G06F 9/45558 718/1 |

OTHER PUBLICATIONS

Related U.S. Appl. No. 14/320,334, filed Jun. 30, 2014.

\* cited by examiner

| Entrypoint IP [63:12] 208 | Reserved [11:6] 210 | CR3 V 212 | IP V 214 | IFUPD [1:0] 216 | U/S 218 | Valid 220 |
|---|---|---|---|---|---|---|
| | | | | | | |

CR3 206

SPPTP 204

EPTP 202

Call CVS descriptor
502

Deepest return CVS descriptor
504

Second deepest return CVS descriptor
506

...

Shallowest return CVS descriptor
508

FIG. 5

CONTROL OF ENTRY INTO PROTECTED MEMORY VIEWS

FIELD

The present disclosure relates to protected memory views, and more particularly, to control of entry into protected memory views with improved efficiency.

BACKGROUND

Security software architectures, such as for example, anti-malware systems, often involve the use of protected memory views that have additional privileges and control capabilities over the computing platform relative to other memory views. A memory view is a domain within a shared address space that is associated with a certain level of protection. In a virtual machine (VM) environment, for example where VM guests are hosted on a platform by a virtual machine monitor (VMM), view switching may typically be accomplished by the VMM, which manages and updates page tables used to map or translate guest physical memory addresses to host physical memory addresses. Transitions between untrusted views and protected views must be securely controlled, however, to prevent untrusted views from inducing unintended control flows within the protected views. For example, an untrusted view should not be able to directly invoke a routine within the protected view that grants the untrusted view access to sensitive or confidential data within the protected view. This secure control of view switching, however, tends to be computationally expensive and may decrease the overall efficiency of the system.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 2 illustrates a Controlled View Switch (CVS) descriptor consistent with one example embodiment of the present disclosure;

FIG. 5 illustrates a call and return stack of CVS descriptors consistent with one example embodiment of the present disclosure;

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for control of entry into protected memory views with improved efficiency. Controlled transitions between memory views, referred to herein as Controlled View Switches (CVSes), may be accomplished using modified extended page table pointer (EPTP)-switching virtual machine function (VMFUNC) instructions or modified far call gates, as will be described in greater detail below, in a manner analogous to the system call model of operating systems (OSes). The modified VMFUNC instruction may be associated with a CVS descriptor created by the virtual machine monitor (VMM). The CVS descriptors may be configured to store view switching and control information including an EPTP and an entrypoint instruction pointer (IP).

Figure 1:
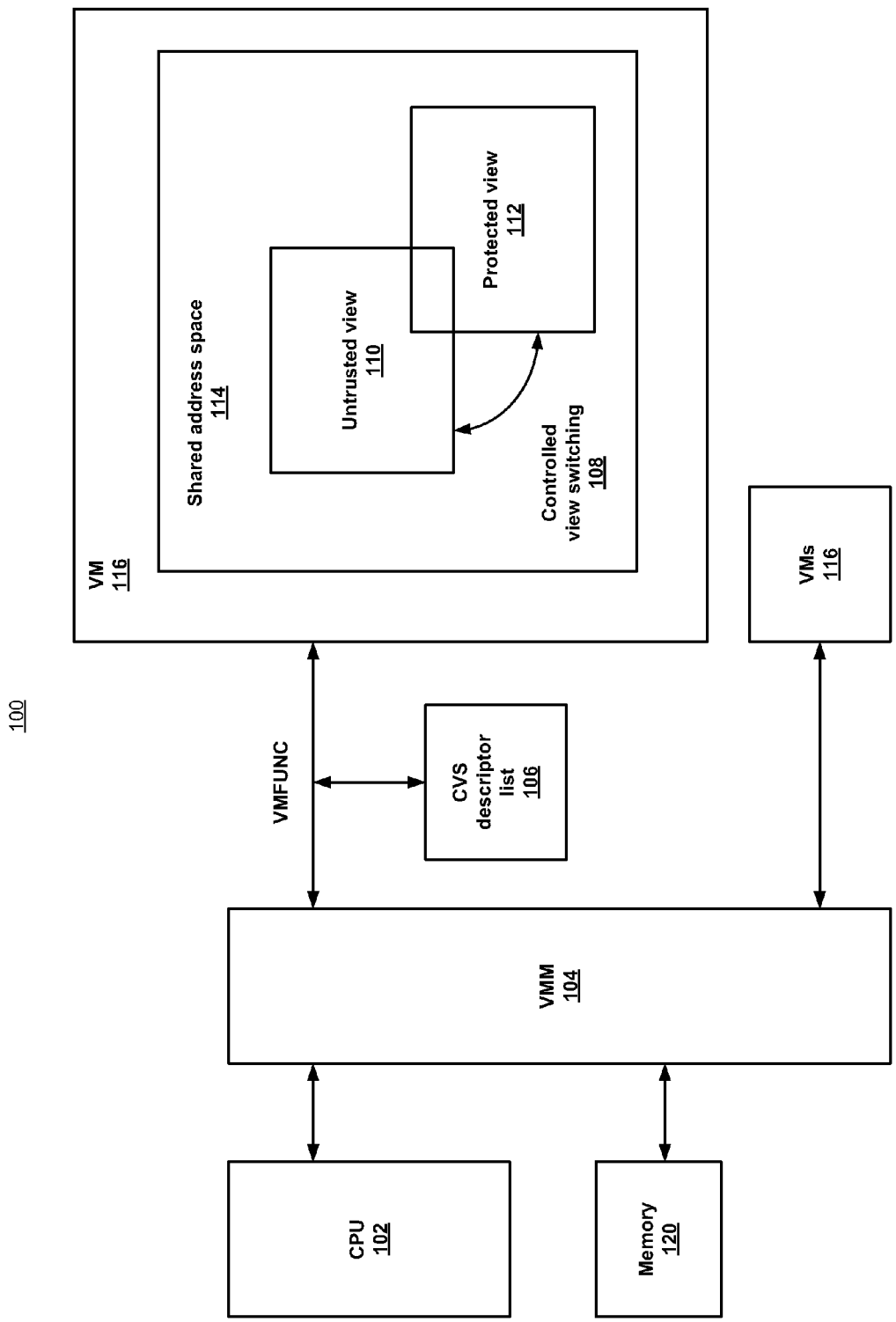
FIG. 1 illustrates a top level system diagram of one example embodiment consistent with the present disclosure.

FIG. 1 illustrates a top level system diagram 100 of one example embodiment consistent with the present disclosure. A processor or CPU 102 may be configured as a host processor for a virtual machine (VM) environment including one or more VMs 116 that are managed by a VMM 104. The VMM may be configured to operate in a highest privilege mode associated with processor 102, sometimes referred to as VMX root mode. The VMs 116 may host execution of VM guest software, including guest operating systems and user and application software. VM guests may be configured to execute in modes of lower privilege (i.e., non VMX root mode). Within both VMX root mode and non VMX root mode, additional privilege levels may be supported ranging from ring 0 (or supervisor) mode to ring 3 (or user) mode. Ring 0 in VMX root mode is a higher privilege level than ring 0 in non VMX root mode.

The system may include memory 120 configured as host physical memory to be protected by VMM 104 from direct access by VM guests. Although VM guests may share the same host physical memory 120, the VMM protects the physical memory through EPT based mappings that map guest physical memory addresses to host physical memory addresses. The EPTs provide a second layer of paging structures (below the conventional OS page table layer) that are controlled by the VMM.

Although various embodiments of the present disclosure are described in terms of EPTs, any suitable type of page table structure or hierarchical page table scheme may be employed, whether currently in use or yet to be developed. In one example of an address mapping scheme, translations for guest mode and host mode can be configured independently. For guest mode, a guest virtual address may be mapped to a guest linear address using segment descriptors (if segmentation is in use) and the guest linear address may be mapped to a guest physical address using guest page tables (if paging is in use), where both mappings are performed in non VMX root mode. The guest physical address may then be mapped to a host physical address using EPTs in VMX root mode. For host addressing, a host virtual address may be mapped to a host linear address using segment descriptors (if segmentation is in use) and the host linear address may be mapped to a host physical address using guest-style page tables, where both mappings are performed in VMX root mode.

The memory accessible to VM guests may be configured as a number of different memory views 110, 112 within a shared address space 114. Some of these views may be untrusted 110 while others may be trusted and protected 112. For example, trusted views may be associated with security (e.g., anti-malware) code that has been verified in some manner, while untrusted views may be associated with other general user applications and software. During system operation it may often be necessary to switch between views. Embodiments of the present disclosure describe an improved controlled view switching mechanism 108 that employs CVS descriptors 106 managed by the VMM 104. The controlled view switch may be initiated by a variation of the VMFUNC instruction or through other suitable methods as will be described in greater detail below, including the re-purpose of any existing instruction or the addition of a new instruction to the CPU's instruction set.

FIG. 2 illustrates a Controlled View Switch (CVS) descriptor 200 consistent with one example embodiment of the present disclosure. The descriptor 200 may be created and used, for example, by the VMM 104 for switching between views in a shared address space. The descriptor 200 may include an extended page table pointer (EPTP) 202 which, in some embodiments, may be a 64 bit field. The descriptor 200 may also include a sub-page protection table pointer (SPPTP) 204 which, in some embodiments, may be a 64 bit field. The descriptor 200 may also include a page table pointer 206, configured to store a processor control register 3 (CR3) value, which, in some embodiments, may be a 64 bit field. The descriptor 200 may also include an entrypoint instruction pointer (IP) 208, configured to store an entrypoint into the switched view, which, in some embodiments, may be a 52 bit field. The descriptor 200 may also include a CR3 valid (CR3 V) indicator bit 212. The descriptor 200 may also include an entrypoint IP valid (IP V) indicator bit 214. The descriptor 200 may also include an interrupt flag update (IFUPD) control field 216, which, in some embodiments, may be a 2 bit field. The descriptor 200 may also include a user mode/supervisor mode (U/S) bit 218 configured to indicate whether the descriptor may be used by software executing in user mode. The descriptor 200 may also include a descriptor valid bit 220 configured to indicate the validity of that descriptor, which may be one of many entries within a table of CVS descriptors, not all of which may be valid (in use) at any given time.

Figure 3:
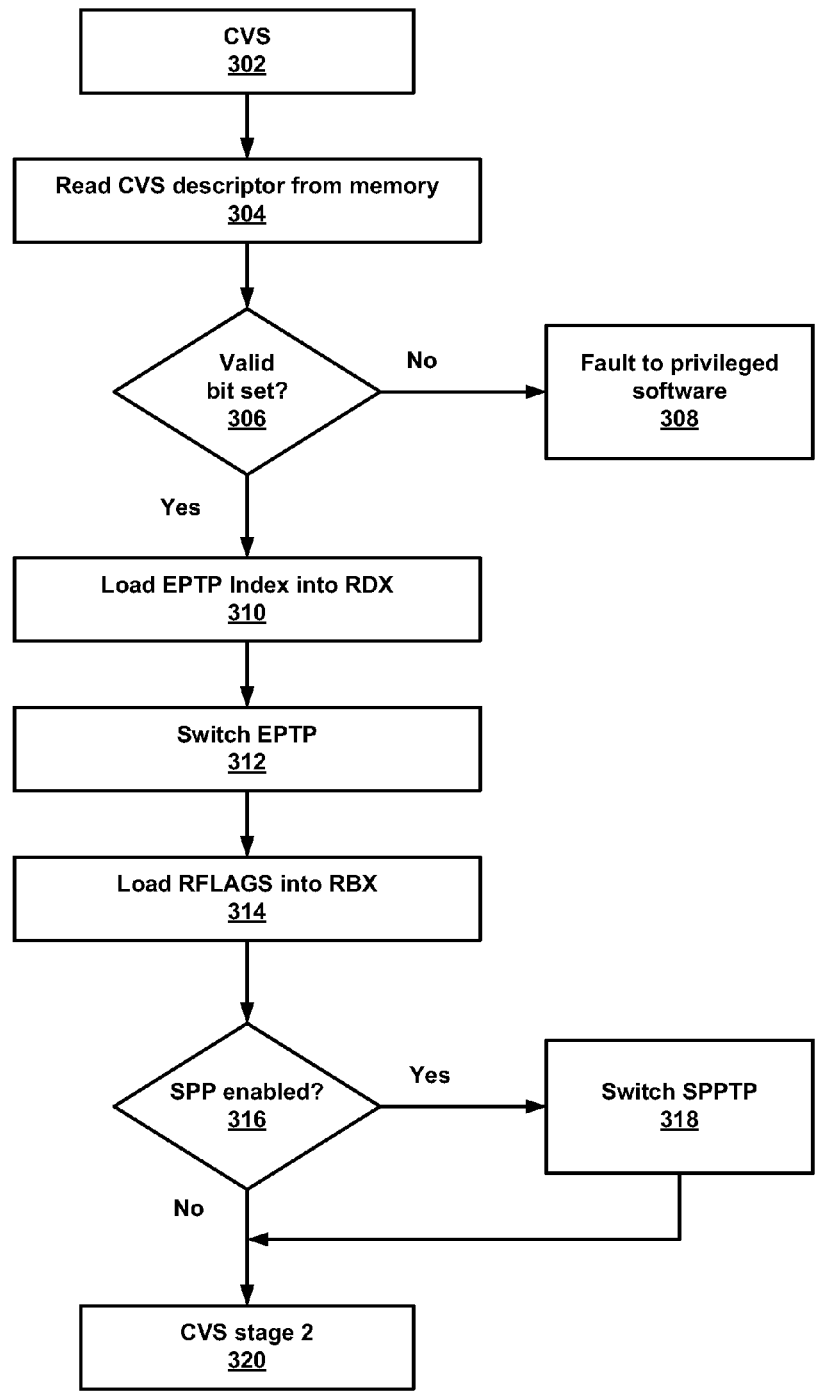
FIGS. 3 and 4 illustrate a flowchart of operations of one example embodiment consistent with the present disclosure.
Figure 4:
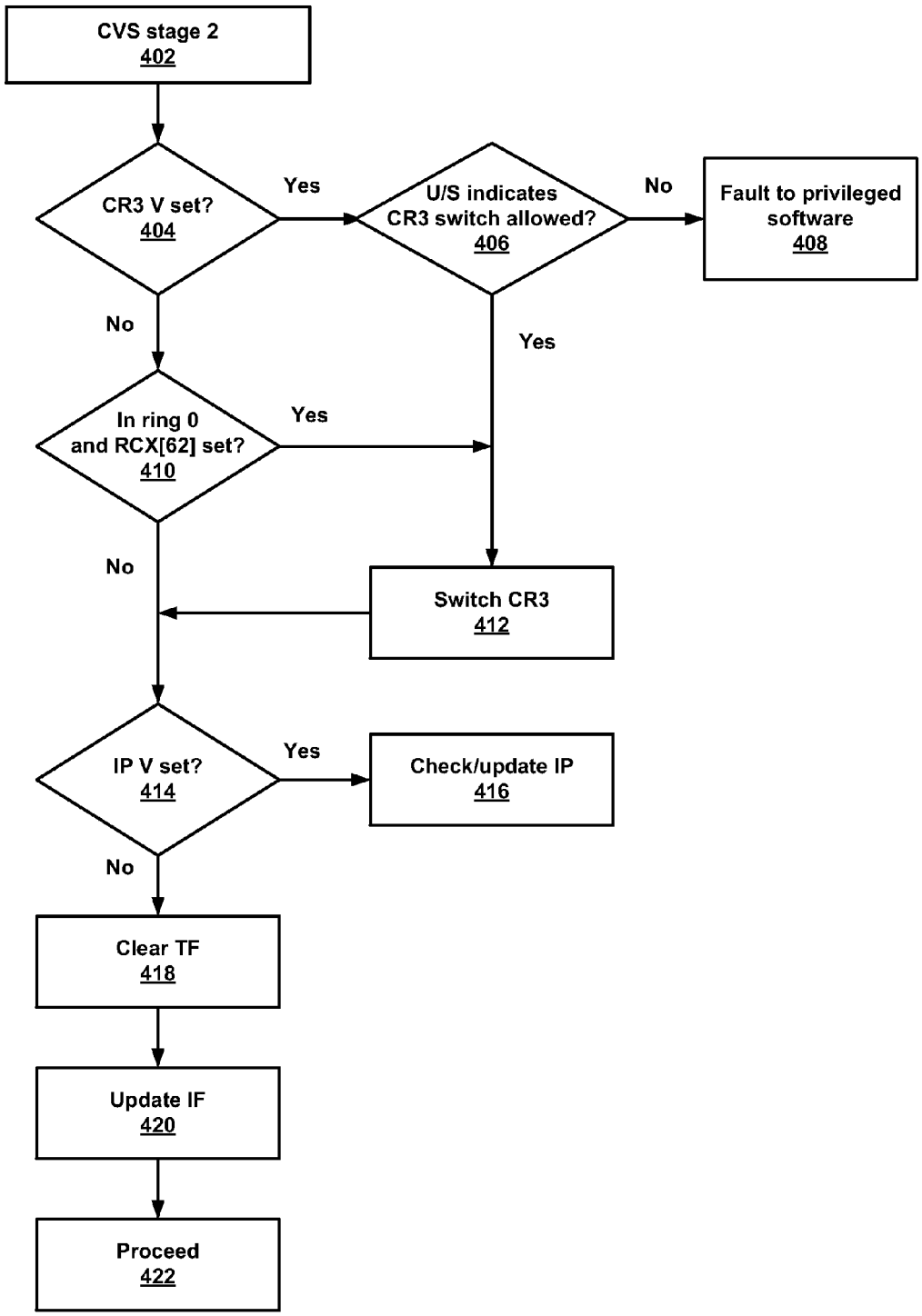

FIGS. 3 and 4 illustrate a flowchart of operations 300 of one example embodiment consistent with the present disclosure. The operations provide a method for controlled memory view switching. Beginning with FIG. 3, at operation 302, a request for controlled view switch is received. The request may be initiated through execution of a VMFUNC instruction. The VMFUNC instruction may use leaf 0 with a newly defined mode or may use a newly defined leaf. At operation 304, a CVS descriptor 200 associated with the request is read from memory. If a validity indication bit 220 of the descriptor is not set, then execution faults to privileged level software at operation 308, for example, the VMM executing in VMX root ring-0 mode. Otherwise, at operation 310, an EPTP index that references the current view is retrieved from the virtual machine control structure (VMCS) and saved to a processor register, for example the RDX register. This allows guest software executing in the new view to access the EPTP index of the previous view and enforce a policy as to which other views are allowed to switch into it. For example, on entry to the guest software for view 3, the code could check that the previous EPTP index is 1 or 2 and signal an error if any other view tries to enter view 3.

At operation 312, the memory view is switched from a first view (the current view or calling view) to a second view (the called view) specified by the EPTP 202 of the descriptor. The first view may be an untrusted view while the second view may be a trusted/protected view.

At operation 314, processor state information is saved. The state information may include a flags register (e.g., RFLAGS) which may be saved to another processor register (e.g., RBX). At operation 316, a check is performed to determine if sub-page protection is enabled. If so, then at operation 318, the processor's sub-page protection table pointer (SPPTP) is switched based on an SPPTP value 204 provided by the CVS descriptor.

Continuing now with FIG. 4, which illustrates the second stage of the controlled memory view switching method, at operation 404 a check is performed to determine if the CR3 valid bit 212 of the CVS descriptor is set. If so, then at operation 406, the U/S bit 218 is checked to determine if CR3 switching is allowed for the current execution mode (e.g., user or supervisor). If it is not allowed, then execution faults to privileged level software at operation 408. Otherwise, at operation 412, the processor's CR3 register is switched based on the CR3 value 206 provided by the CVS descriptor. In some operating modes of the CPU 102, it may be necessary to truncate the CR3 value by dropping some number of leftmost bits to conform to bit length constraints. In some embodiments, the check of the U/S bit 218 (and the generation of any associated execution fault) may be performed prior to checking the CR3 valid bit 212, so that the check of the U/S bit 218 is performed regardless of whether the CR3 valid bit is set.

If the CR3 valid bit 212, checked at operation 404, is not set, then an additional check is performed at operation 410 as follows. If the processor is executing in Ring 0 and a bit (e.g. bit 62) of a processor register (e.g. register RCX) is set, then, at operation 412, the processor's CR3 register is switched. In this case, however, it is switched based on the value stored in another processor register, for example register RBX. This may be useful in cases where it is difficult to ensure that acceptable memory mappings exist for both sides of a view switch within a single page table.

The method proceeds with operation 414, where the entrypoint IP valid bit 214 is checked. If it is valid then, at operation 416, an adjusted entrypoint IP may be computed, for example by shifting the entrypoint IP 208 left and padding it on the right with as many zero bits as are required to form a virtual address of the maximal size required by the CPU 102, and then truncating it as necessary to match the current operating mode of the CPU 102 by dropping the appropriate number of bits on the left. Then, the processor instruction pointer may be updated to the adjusted entrypoint IP, if they do not already match. Alternatively, the processor instruction pointer may be compared to the adjusted entrypoint IP and execution faults to privileged level software in the case of a mismatch. At operation 418, the processor's trap flag is cleared to prevent control from being assumed by an untrusted trap handler.

At operation 420, the processor's interrupt flag (IF) may be updated depending on the value of the IFUPD control field 216 provided by the CVS descriptor. In some embodiments: if IFUPD equals zero, the IF is not updated; if IFUPD equals one, the IF is cleared; and if IFUPD equals two, the IF is set. This may be useful for returning to less privileged views. In some embodiments, if IFUPD equals three, the IF may be loaded from a processor register, for example RCX bit 61.

In some embodiments, the valid bit 220 of the CVS descriptor must be set to enable the descriptor for use. Alternatively, the valid bit may be omitted and the descriptor validity may be determined based on some other suitable method, for example, based on the validity of the EPTP value 202.

The CVS descriptor format 200 may be configured to support tradeoffs between security obligations and the overhead required to perform a CVS using the descriptor. For example, configuring the descriptors to switch less state information may reduce the overhead associated with performing the CVS, but increase the security obligations placed on the system. For example, a descriptor that does not provide for clearing the IF would require that interrupts be controlled in some other way.

Regardless of the configuration of the CVS descriptors, the VMM must control the processor's debug registers to prevent them from being used by an untrusted source to gain control away from a protected view. For example, in some embodiments, the VMM may disable the CVS mechanism when a debug register is set, to require VMM intervention to perform a view switch.

Unlike transitions between different protection rings, dedicated processor support may not be required for returning from the called view to the caller view. In some embodiments, a software implementation may include return dispatcher code that is inserted in the returned-to (caller) view at a set "return entrypoint." This may require duplicated descriptors: one to set the interrupt flag, and one to clear the interrupt flag depending on the original state of the interrupt flag in the caller view. The return dispatcher can restore the trap flag itself, since that is unprivileged state data. The return dispatcher may also restore the CR3 if it is executing in ring 0 and an acceptable mapping for the dispatcher exists in the page tables used by the called view. Alternatively, the called view exit stub can restore the caller's CR3 if an acceptable mapping for the called exit stub exists in the newly-loaded page tables. In yet another alternative for code executing in ring 0, a CR3 value may be specified for loading during the CVS, the caller view having saved the CR3 prior to invoking the called view. The saved value can be provided in a processor register (e.g. RBX) and a parameter (e.g. a set bit 62 in RCX) can be provided to the CVS instruction to cause it to load the specified new CR3 value during the return to the caller view. Descriptors that specify a single CR3 value may be used for either ring 0 or ring 3 as applicable. Finally, the return dispatcher can jump back to the appropriate return IP.

In some embodiments, however, a dedicated hardware-supported return mechanism may improve CVS efficiency. The processor may be configured to save information about the state of the system prior to the CVS and then restore the system state using that information. The return may be triggered through execution of a VMFUNC instruction with another newly defined leaf, or by modifying the operation of the primary VMFUNC leaf (e.g., by performing a return when bit 63 of the RCX register is set), or any other suitable instruction or command, whether re-purposed from an existing instruction or newly added to the CPU's instruction set.

In some embodiments, one or more stacks may be implemented to support nested CVS calls and returns as illustrated in FIG. 5. The stacks may be stored within a host physical memory region designated by hardware-enforced boundaries. Alternatively, a page of memory may be defined for each view that is referenced from the EPTP list and configured to store the call CVS descriptor (described above) as the first entry in addition to a stack of return descriptors associated with each instance for which that view switched to another view. The boundaries for the stack may be implicitly defined to encompass that page, excluding the call descriptor, since the call descriptor is not intended for use during CVS returns. Alternatively, the descriptors may be saved in the host virtual address space so that stack underflow and overflow conditions may be detected using guard pages. An associated stack pointer would need to be defined, for example within available bits in the call descriptor.

In yet another embodiment, the obligation for called view dispatchers to check the index of caller views when restricting transitions between views may be avoided by defining a CVS descriptor bitmap referenced from the VMCS that controls which CVS descriptors can be used. Alternatively, the CVS descriptor list address may be switched when performing a CVS. In either case, the address for the new CVS descriptor bitmap or CVS descriptor list may be specified in the CVS descriptor.

In some embodiments, to conserve memory with a tradeoff of reduced flexibility, a single allowable entrypoint IP address may be stored in a VMCS field. For example, the address may be specified as a guest virtual address, a guest linear address, a guest physical address or a host physical address. Additionally, if descriptors are being used only to switch the EPTP and restrict or switch the entrypoint IP, the other fields in the descriptor may be eliminated to save memory. The descriptor may then be defined to include just the EPTP and entrypoint IP. Other embodiments may be defined in a similar manner to switch or restrict other subsets of processor state.

In another embodiment, mappings from guest linear addresses to guest physical addresses may be controlled without switching the CR3 value during the CVS. A CR3 target list, a feature of Virtualization Technology extension hardware (VT-x), may be employed to allow only a specified set of CR3s to be used at any time. The VMM may be configured to ensure that each of those CR3s points to an asserted page table hierarchy with acceptable linear-to-physical mappings in each protected memory view. The policy for which mappings are acceptable may depend on the application of the system. For example, in some cases it may be necessary to set the mappings for the linear addresses of pages containing view entrypoints to specific physical addresses. This approach, however, may introduce an undesirable level of overhead due to the limited size of the CR3 target list provided by VT-x (e.g., currently just four entries). Thus, it may be beneficial to expand the CR3 target list to support a larger number of entries which may require using an in-memory data structure to contain some or all of the CR3 target list entries.

It may additionally be necessary to control virtual to linear address mappings by controlling the configuration of segment registers. This can be accomplished using existing controls to monitor the memory regions corresponding to the descriptor tables, and the descriptor table registers: interrupt descriptor table register (IDTR), global descriptor table register (GDTR) local descriptor table register (LDTR), and table register (TR).

Figure 6:
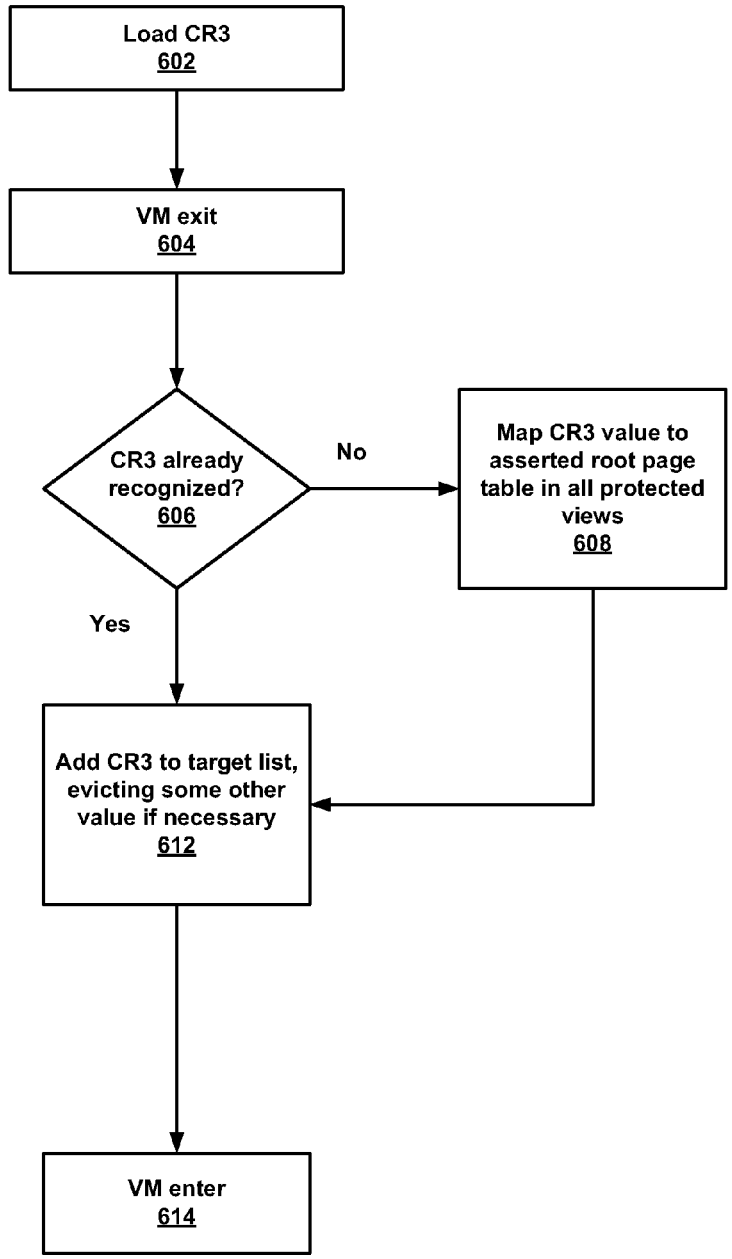
FIG. 6 illustrates a flowchart of operations of another example embodiment consistent with the present disclosure.

A flowchart illustrating the handling of a new CR3 value in this manner is shown in FIG. 6. At operation 602, a new CR3 value is loaded and, at operation 604, a VM exit instruction is executed to return control from guest software to the VMM. At operation 606, it is determined whether the CR3 is already recognized. If not, then at operation 608, the new CR3 value is mapped to an asserted root page table shared by all protected views, and at operation 612 the CR3 is added to the target list (evicting another value if necessary). Otherwise, if the CR3 is already recognized, then again at operation 612, it is added to the target list. In either case, at operation 614, a VM enter instruction is executed to return from the VMM to the guest software.

Figure 7:
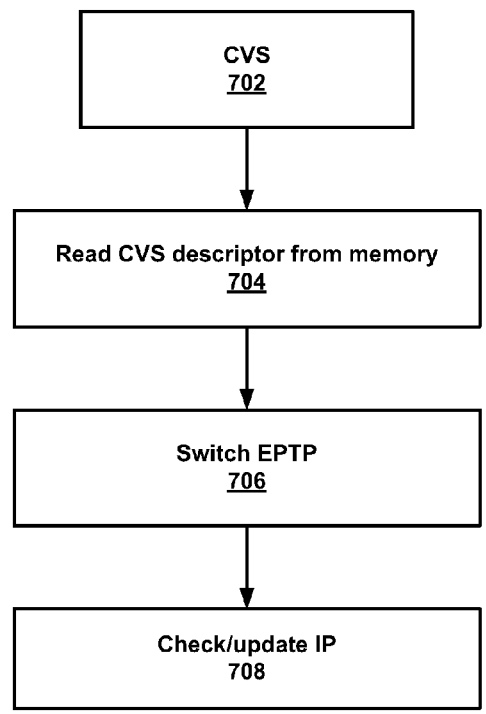
FIG. 7 illustrates a flowchart of operations of another example embodiment consistent with the present disclosure.

Also, using this approach, the CVS flowchart may be simplified as shown in FIG. 7. At operation 702, a request for controlled view switch is received. At operation 704, a CVS descriptor 200 associated with the request is read from memory. At operation 706, the memory view is switched from the first view to the second view based on the EPTP 202 of the descriptor. At operation 708, the processor instruction pointer is updated to the entrypoint IP 208 of the descriptor, if they do not already match. In another embodiment, at operation 708, the processor instruction pointer may be compared to the entrypoint IP 208 and a fault generated if they do not match.

In some embodiments, as an alternative to CVS descriptors, fields within code segment descriptors may be redefined to provide view switching. Specifically, the base and limit fields in 64-bit mode code segment descriptors may be redefined to store an EPTP bit range (EPTP[51:12]), since those fields are currently unused. Thus, when a code segment descriptor is loaded, such as during an interrupt delivery, EPTP[51:12] may be updated with the value from the base and limit field for the code segment descriptor specified in the interrupt gate. This could also occur during far calls through call gates, to permit transitions between views with controlled entrypoints. A reserved value of zero may be used in the base and limit fields of the segment descriptors to indicate that the EPTP should remain unchanged. Attempts to access a code segment that would change EPTP without using a gate (such as with a far call or interrupt return) should generate a fault to privileged software. In other embodiments, an EPTP value to be used during the view switch may be specified in a Task-State Segment (TSS) so that it would take effect when switching to that task.

To simplify control of interrupts and exceptions, the interrupt descriptor table register (IDTR), global descriptor table register (GDTR) and local descriptor table register (LDTR) may be redefined to contain guest physical addresses instead of guest linear addresses. The VMM could then control the locations of the corresponding tables without needing to control the mappings from guest linear to guest physical addresses for those registers. Alternately, using existing controls the VMM can monitor the memory regions corresponding to the descriptor tables, and the descriptor table registers (IDTR, GDTR, LDTR, and TR).

Figure 8:
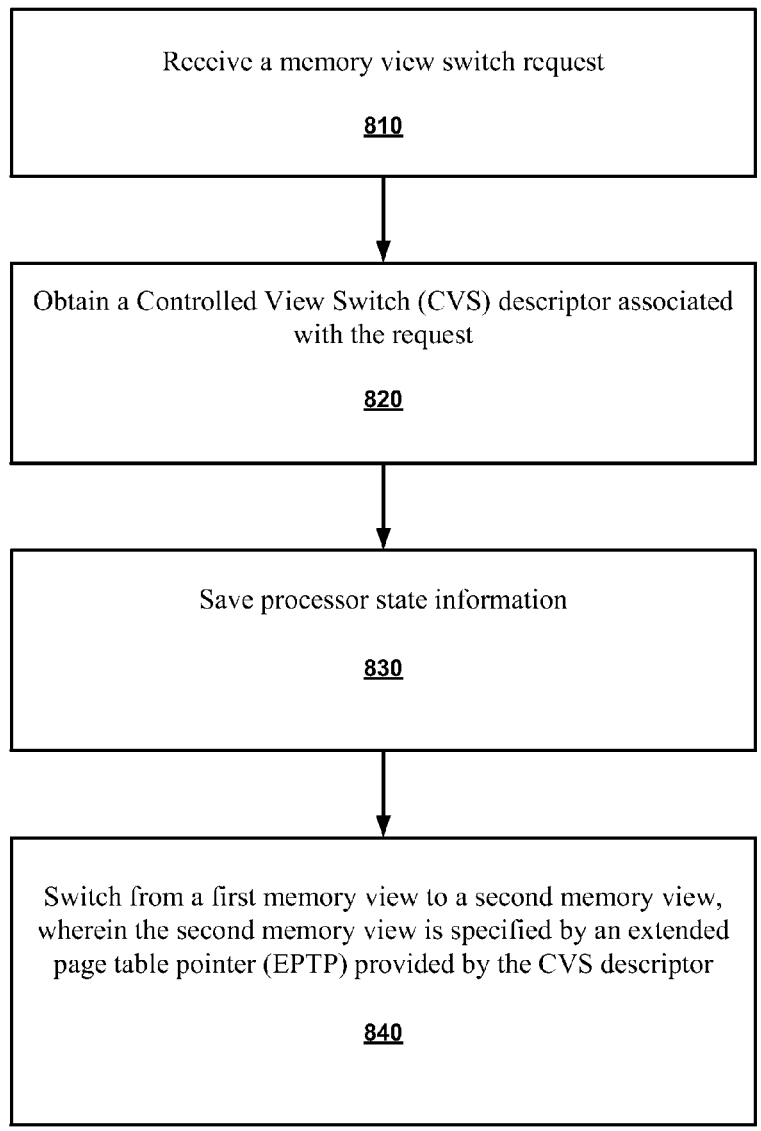
FIG. 8 illustrates a flowchart of operations of another example embodiment consistent with the present disclosure.

FIG. 8 illustrates a flowchart of operations 800 of another example embodiment consistent with the present disclosure. At operation 810, a memory view switch request is received. The request may be associated with the execution of a virtual machine function (VMFUNC) instruction. At operation 820, a CVS descriptor associated with the request is obtained. At operation 830, processor state information is saved. At operation 840, a switch is performed from a first memory view to a second memory view. The second memory view is specified by an extended page table pointer (EPTP) provided by the CVS descriptor.

Figure 9:
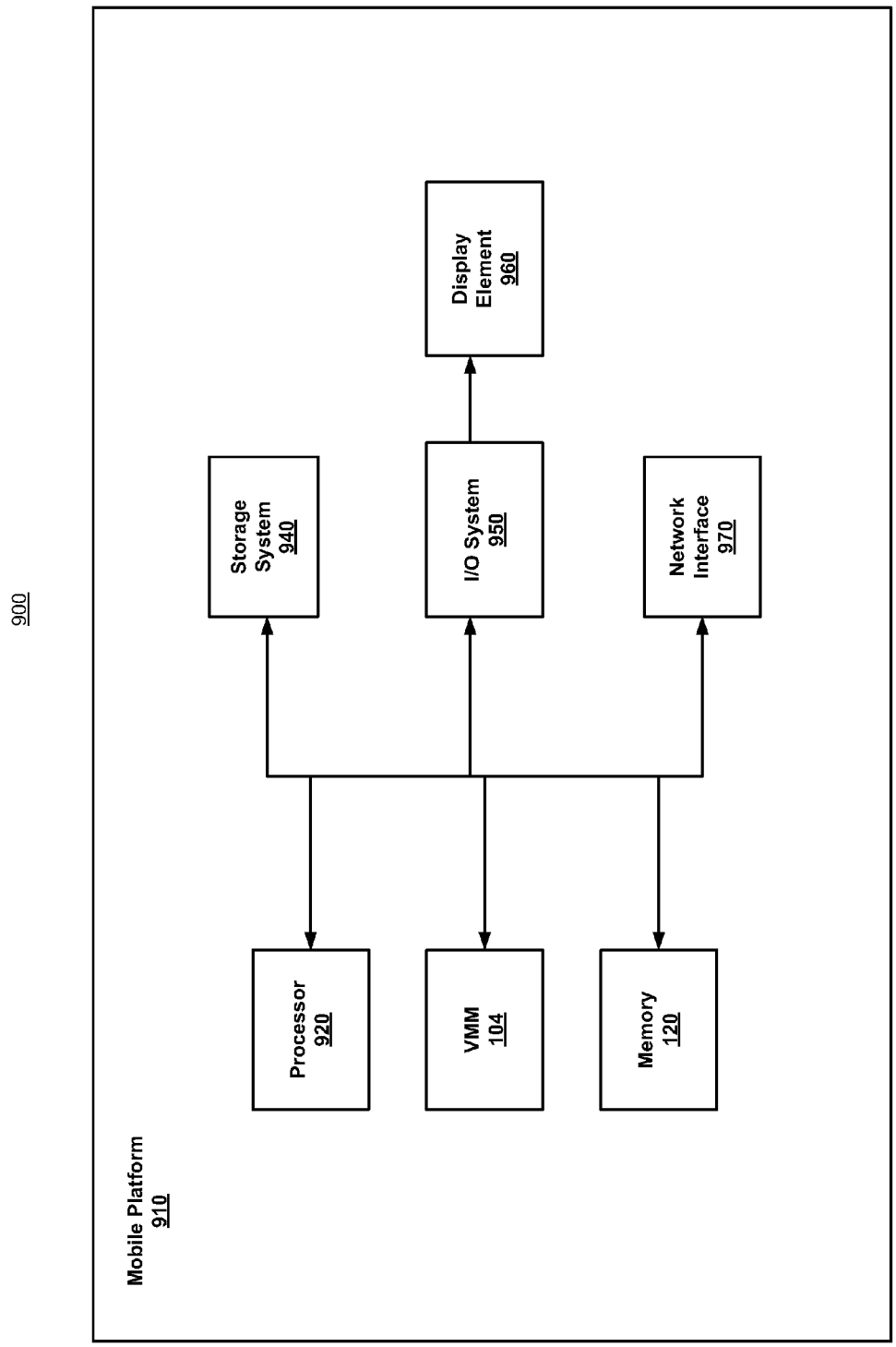
FIG. 9 illustrates a system diagram of a platform of another example embodiment consistent with the present disclosure.

FIG. 9 illustrates a system diagram 900 of one example embodiment consistent with the present disclosure. The system 900 may be a mobile platform 910 or computing device such as, for example, a smart phone, smart tablet, personal digital assistant (PDA), mobile Internet device (MID), convertible tablet, notebook or laptop computer, or any other suitable device. It will be appreciated, however, that embodiments of the system described herein are not limited to mobile platforms, and in some embodiments, the system 900 may be a workstation or desktop computer. The device may generally present various interfaces to a user via a display element 960 such as, for example, a touch screen, liquid crystal display (LCD) or any other suitable display type.

The system 900 is shown to include one or more processors 920, a VMM 104 and memory 120. In some embodiments, the processors 920 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multi-threaded cores in that they may include more than one hardware thread context (or "logical processor") per core. The memory 120 may be coupled to the processors 920 and memory accesses may be channeled through VMM 104 as described previously. The memory 120 may be any of a wide variety of memories (including various layers of memory hierarchy and/or memory caches) as are known or otherwise available to those of skill in the art. It will be appreciated that the processors and memory may be configured to store, host and/or execute one or more operating systems, kernels, user applications or other software modules, which may execute in any of a number of available privilege modes, including, for example, VMX root mode, ring 0 mode and ring 3 mode. These applications may include, but not be limited to, for example, any type of computation, communication, data management, data storage and/or user interface task. In some embodiments, these applications may employ or interact with any other components of the mobile platform 910.

The memory 120 may include any number of shared address spaces 114 comprising trusted and untrusted views as described previously and the processor 920 and VMM 104 may be configured to perform controlled switching between these views.

System 900 is also shown to include a storage system 940, for example a hard disk drive (HDD) or solid state drive (SSD).

System 900 is also shown to include an input/output (IO) system or controller 950 which may be configured to enable or manage data communication between processor 920 and other elements of system 900 or other elements (not shown) external to system 900.

System 900 is also shown to include network interface module 970 which may include wireless communication capabilities, such as, for example, cellular communications, Wireless Fidelity (WiFi), Bluetooth®, and/or Near Field Communication (NFC). The wireless communications may conform to or otherwise be compatible with any existing or yet to be developed communication standards including past, current and future version of Bluetooth®, Wi-Fi and mobile phone communication standards.

It will be appreciated that in some embodiments, the various components of the system 900 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An application (or "app") may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip. In some embodiments, a module may thus be implemented in software and/or firmware and may comprise one or more processes, threads or subroutines of a single process. Additionally, in some embodiments, a module may be distributed and executed on separate devices.

Thus, the present disclosure provides systems, devices, methods and computer readable media for controlled memory view switching. The following examples pertain to further embodiments.

According to Example 1 there is provided a system for controlled memory view switching. The system may include a memory module including a shared address space between a first memory view and a second memory view; a virtual machine monitor (VMM) to maintain a list of Controlled View Switch (CVS) descriptors; and a processor to receive a memory view switch request and to execute an instruction to save processor state information and switch from the first memory view to the second memory view, and the second memory view is specified by an extended page table pointer (EPTP) provided by one of the CVS descriptors.

Example 2 may include the subject matter of Example 1, and the instruction is a virtual machine function (VMFUNC) instruction of the processor.

Example 3 may include the subject matter of Examples 1 and 2, and the processor is further to update an instruction pointer (IP) to an entrypoint IP in the second memory view, the entrypoint IP provided by the CVS descriptor.

Example 4 may include the subject matter of Examples 1-3, and the processor is further to store an EPTP index associated with the first memory view to a register of the processor, the register available to guest software executing in the second memory view.

Example 5 may include the subject matter of Examples 1-4, and the processor is further to switch a sub-page protection table pointer (SPPTP), if sub-page protection is enabled, the switching based on an SPPTP provided by the CVS descriptor.

Example 6 may include the subject matter of Examples 1-5, further including a processor flags register, and the processor state information includes contents of the processor flags register.

Example 7 may include the subject matter of Examples 1-6, and the processor is further to update a page table pointer register of the processor based on a value provided by the CVS descriptor.

Example 8 may include the subject matter of Examples 1-7, and the processor is further to update a page table pointer register of the processor based on a value provided by a target list of page table pointers stored in a the memory module.

Example 9 may include the subject matter of Examples 1-8, and the processor is further to clear a trap flag of the processor.

Example 10 may include the subject matter of Examples 1-9, and the processor is further to update an interrupt flag of the processor based on an interrupt flag indicator provided by the CVS descriptor.

According to Example 11 there is provided at least one computer-readable storage medium having instructions stored thereon which when executed by a processor result in the following operations for controlled memory view switching. The operations may include receiving a memory view switch request; obtaining a Controlled View Switch (CVS) descriptor associated with the request; saving processor state information; and switching from a first memory view to a second memory view, and the second memory view is specified by an extended page table pointer (EPTP) provided by the CVS descriptor.

Example 12 may include the subject matter of Example 11, and the memory view switch request is associated with execution of a virtual machine function (VMFUNC) instruction of the processor.

Example 13 may include the subject matter of Examples 11 and 12, further including the operation of updating the instruction pointer (IP) of the processor to an entrypoint IP provided by the CVS descriptor.

Example 14 may include the subject matter of Examples 11-13, further including the operation of storing an EPTP index associated with the first memory view to a register of the processor, the register available to guest software executing in the second memory view.

Example 15 may include the subject matter of Examples 11-14, further including the operation of switching a sub-page protection table pointer (SPPTP), if sub-page protection is enabled, the switching based on an SPPTP provided by the CVS descriptor.

Example 16 may include the subject matter of Examples 11-15, and the processor state information includes a processor flags register.

Example 17 may include the subject matter of Examples 11-16, further including the operation of updating a page table pointer register of the processor based on a value provided by the CVS descriptor.

Example 18 may include the subject matter of Examples 11-17, further including the operation of updating a page table pointer register of the processor based on a value provided by a target list of page table pointers.

Example 19 may include the subject matter of Examples 11-18, further including the operation of clearing a trap flag of the processor.

Example 20 may include the subject matter of Examples 11-19, further including the operation of updating an interrupt flag of the processor based on an interrupt flag indicator provided by the CVS descriptor.

Example 21 may include the subject matter of Examples 11-20, and the first memory view is an untrusted view and the second memory view is a trusted protected view.

Example 22 may include the subject matter of Examples 11-21, further including the operation of disabling the controlled memory view switching based on the CVS descriptor when the processor is in a debug mode.

According to Example 23 there is provided a system for controlled memory view switching. The system may include a memory module including a shared address space between a first memory view and a second memory view; and a processor to receive a memory view switch request and to execute an instruction to save processor state information and switch from the first memory view to the second memory view, and the second memory view is specified by an extended page table pointer (EPTP) provided by a code segment descriptor.

Example 24 may include the subject matter of Example 23, and the memory view switch request is associated with an interrupt of the processor and the code segment descriptor is specified by an interrupt gate.

Example 25 may include the subject matter of Examples 23 and 24, and the memory view switch request is associated with a far call executed by the processor and the code segment descriptor is specified by a call gate.

Example 26 may include the subject matter of Examples 23-25, and the memory view switch request is associated with a task switch executed by the processor and EPTP is specified by a Task-State Segment (TSS).

According to Example 27 there is provided a method for controlled memory view switching. The method may include receiving a memory view switch request; obtaining a Controlled View Switch (CVS) descriptor associated with the request; saving processor state information; and switching from a first memory view to a second memory view, and the second memory view is specified by an extended page table pointer (EPTP) provided by the CVS descriptor.

Example 28 may include the subject matter of Example 27, and the memory view switch request is associated with execution of a virtual machine function (VMFUNC) instruction of the processor.

Example 29 may include the subject matter of Example 27 and 28, further including updating the instruction pointer (IP) of the processor to an entrypoint IP provided by the CVS descriptor.

Example 30 may include the subject matter of Examples 27-29, further including storing an EPTP index associated with the first memory view to a register of the processor, the register available to guest software executing in the second memory view.

Example 31 may include the subject matter of Examples 27-30, further including switching a sub-page protection table pointer (SPPTP), if sub-page protection is enabled, the switching based on an SPPTP provided by the CVS descriptor.

Example 32 may include the subject matter of Examples 27-31, and the processor state information includes a processor flags register.

Example 33 may include the subject matter of Examples 27-32, further including updating a page table pointer register of the processor based on a value provided by the CVS descriptor.

Example 34 may include the subject matter of Examples 27-33, further including updating a page table pointer register of the processor based on a value provided by a target list of page table pointers.

Example 35 may include the subject matter of Examples 27-34, further including clearing a trap flag of the processor.

Example 36 may include the subject matter of Examples 27-35, further including updating an interrupt flag of the processor based on an interrupt flag indicator provided by the CVS descriptor.

Example 37 may include the subject matter of Examples 27-36, and the first memory view is an untrusted view and the second memory view is a trusted protected view.

Example 38 may include the subject matter of Examples 27-37, further including disabling the controlled memory view switching based on the CVS descriptor when the processor is in a debug mode.

According to Example 39 there is provided a system for controlled memory view switching. The system may include means for receiving a memory view switch request; means for obtaining a Controlled View Switch (CVS) descriptor associated with the request; means for saving processor state information; and means for switching from a first memory view to a second memory view, and the second memory view is specified by an extended page table pointer (EPTP) provided by the CVS descriptor.

Example 40 may include the subject matter of Example 39, and the memory view switch request is associated with execution of a virtual machine function (VMFUNC) instruction of the processor.

Example 41 may include the subject matter of Examples 39 and 40, further including means for updating the instruction pointer (IP) of the processor to an entrypoint IP provided by the CVS descriptor.

Example 42 may include the subject matter of Examples 39-41, further including means for storing an EPTP index associated with the first memory view to a register of the processor, the register available to guest software executing in the second memory view.

Example 43 may include the subject matter of Examples 39-42, further including means for switching a sub-page protection table pointer (SPPTP), if sub-page protection is enabled, the switching based on an SPPTP provided by the CVS descriptor.

Example 44 may include the subject matter of Examples 39-43, and the processor state information includes a processor flags register.

Example 45 may include the subject matter of Examples 39-44, further including means for updating a page table pointer register of the processor based on a value provided by the CVS descriptor.

Example 46 may include the subject matter of Examples 39-45, further including means for updating a page table pointer register of the processor based on a value provided by a target list of page table pointers.

Example 47 may include the subject matter of Examples 39-46, further including means for clearing a trap flag of the processor.

Example 48 may include the subject matter of Examples 39-47, further including means for updating an interrupt flag of the processor based on an interrupt flag indicator provided by the CVS descriptor.

Example 49 may include the subject matter of Examples 39-48, and the first memory view is an untrusted view and the second memory view is a trusted protected view.

Example 50 may include the subject matter of Examples 39-49, further including means for disabling the controlled memory view switching based on the CVS descriptor when the processor is in a debug mode.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for controlled memory view switching, said system comprising:
   a memory module comprising a shared address space between a first memory view and a second memory view, wherein a memory view comprises a domain within a shared address space that is associated with a predefined level of protection;
   a virtual machine monitor (VMM) to maintain a list of Controlled View Switch (CVS) descriptors, wherein a CVS comprises a controlled transition between memory views; and
   a processor to receive a memory view switch request and to execute an instruction to save processor state information and switch from said first memory view to said second memory view, wherein said second memory view is specified by an extended page table pointer (EPTP) provided by one of said CVS descriptors.

2. The system of claim 1, wherein said instruction is a virtual machine function (VMFUNC) instruction of said processor.

3. The system of claim 1, wherein said processor is further to update an instruction pointer (IP) to an entrypoint IP in said second memory view, said entrypoint IP provided by said CVS descriptor.

4. The system of claim 1, wherein said processor is further to store an EPTP index associated with said first memory view to a register of said processor, said register available to guest software executing in said second memory view.

5. The system of claim 1, wherein said processor is further to switch a sub-page protection table pointer (SPPTP), if sub-page protection is enabled, said switching based on an SPPTP provided by said CVS descriptor.

6. The system of claim 1, further comprising a processor flags register, wherein said processor state information comprises contents of said processor flags register.

7. The system of claim 1, wherein said processor is further to update a page table pointer register of said processor based on a value provided by said CVS descriptor.

8. The system of claim 1, wherein said processor is further to update a page table pointer register of said processor based on a value provided by a target list of page table pointers stored in a said memory module.

9. The system of claim 1, wherein said processor is further to clear a trap flag of said processor.

10. The system of claim 1, wherein said processor is further to update an interrupt flag of said processor based on an interrupt flag indicator provided by said CVS descriptor.

11. At least one non-transitory computer-readable storage medium having instructions stored thereon which when executed by a processor result in the following operations for controlled memory view switching, said operations comprising:
   receiving a memory view switch request, wherein a memory view comprises a domain within a shared address space that is associated with a predefined level of protection;
   obtaining a Controlled View Switch (CVS) descriptor associated with said request, wherein a CVS comprises a controlled transition between memory views;
   saving processor state information; and
   switching from a first memory view to a second memory view, wherein said second memory view is specified by an extended page table pointer (EPTP) provided by said CVS descriptor.

12. The computer-readable storage medium of claim 11, wherein said memory view switch request is associated with execution of a virtual machine function (VMFUNC) instruction of said processor.

13. The computer-readable storage medium of claim 11, further comprising the operation of updating the instruction pointer (IP) of said processor to an entrypoint IP provided by said CVS descriptor.

14. The computer-readable storage medium of claim 11, further comprising the operation of storing an EPTP index associated with said first memory view to a register of said processor, said register available to guest software executing in said second memory view.

15. The computer-readable storage medium of claim 11, further comprising the operation of switching a sub-page protection table pointer (SPPTP), if sub-page protection is enabled, said switching based on an SPPTP provided by said CVS descriptor.

16. The computer-readable storage medium of claim 11, wherein said processor state information comprises a processor flags register.

17. The computer-readable storage medium of claim 11, further comprising the operation of updating a page table pointer register of said processor based on a value provided by said CVS descriptor.

18. The computer-readable storage medium of claim 11, further comprising the operation of updating a page table pointer register of said processor based on a value provided by a target list of page table pointers.

19. The computer-readable storage medium of claim 11, further comprising the operation of clearing a trap flag of said processor.

20. The computer-readable storage medium of claim 11, further comprising the operation of updating an interrupt flag of said processor based on an interrupt flag indicator provided by said CVS descriptor.

21. The computer-readable storage medium of claim 11, wherein said first memory view is an untrusted view and said second memory view is a trusted protected view.

22. A system for controlled memory view switching, said system comprising:
   a memory module comprising a shared address space between a first memory view and a second memory view, wherein a memory view comprises a domain within a shared address space that is associated with a predefined level of protection; and
   a processor to receive a memory view switch request and to execute an instruction to save processor state information and switch from said first memory view to said second memory view, wherein said second memory view is specified by an extended page table pointer (EPTP) provided by a code segment descriptor.

23. The system of claim 22, wherein said memory view switch request is associated with an interrupt of said processor and said code segment descriptor is specified by an interrupt gate.

24. The system of claim 22, wherein said memory view switch request is associated with a far call executed by said processor and said code segment descriptor is specified by a call gate.

25. The system of claim 22, wherein said memory view switch request is associated with a task switch executed by said processor and EPTP is specified by a Task-State Segment (TSS).

* * * * *